United States Patent [19]

King

[11] 4,345,869
[45] Aug. 24, 1982

[54] CONVEYOR SYSTEM FOR LOADING AND UNLOADING TRUCKS AND TRAILERS

[76] Inventor: John L. King, 1740 Kansas, Memphis, Tenn. 38109

[21] Appl. No.: 203,644

[22] Filed: Nov. 3, 1980

[51] Int. Cl.³ .............................................. B60P 1/38
[52] U.S. Cl. .................................. 414/520; 200/161; 414/528; 414/909
[58] Field of Search .................. 414/520, 528; 296/10, 296/181, 183; 200/156, 161

[56] References Cited

U.S. PATENT DOCUMENTS

| | | | |
|---|---|---|---|
| 1,522,939 | 1/1925 | Benn et al. | 200/161 |
| 2,507,252 | 5/1950 | Hoover | 414/528 |
| 3,317,066 | 5/1967 | Hamm | 414/520 X |
| 3,454,172 | 7/1969 | Carr | 414/499 X |

*Primary Examiner*—Robert G. Sheridan

[57] ABSTRACT

Subject system is a permanent fixture of the vehicle to which attached and is electrically driven (AC or DC) for moving cargo along the floor of a cargo body. Lanyard structure is rigged upon one wall of the cargo body for remotely operating an electrical switch which enables the movement of the conveyor to readily be controlled from any location along the length of the cargo body. A series of load-bearing flaps are hingedly attached to the floor of the cargo body along a common hinge axis which extends along the length of the conveyor and parallel with the travel thereof. Each of the flaps may be swingably moved between: (1) a load-bearing position wherein each one overlays a portion of the conveyor, and (2) a conveyor exposed position wherein each one overlays a portion of the floor along side the conveyor. The flap arrangement is constructed so as to be capable of supporting cargo when in the load-bearing position, although, movement of the subjacent conveyor structure remains unhindered thereby.

4 Claims, 11 Drawing Figures

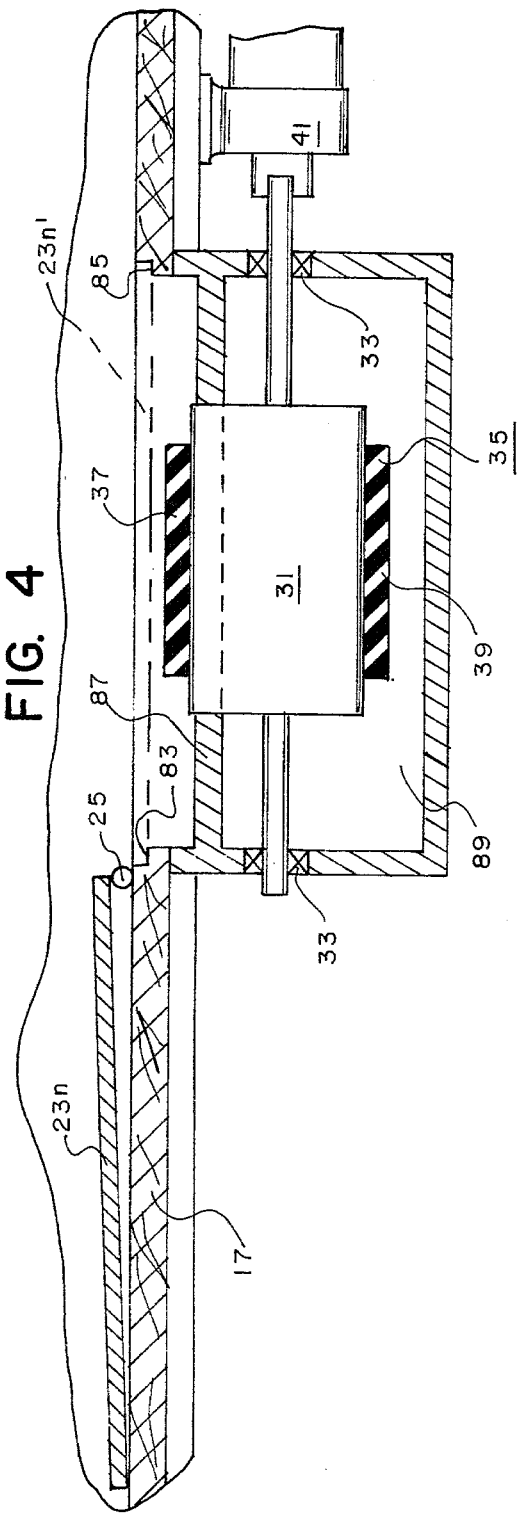
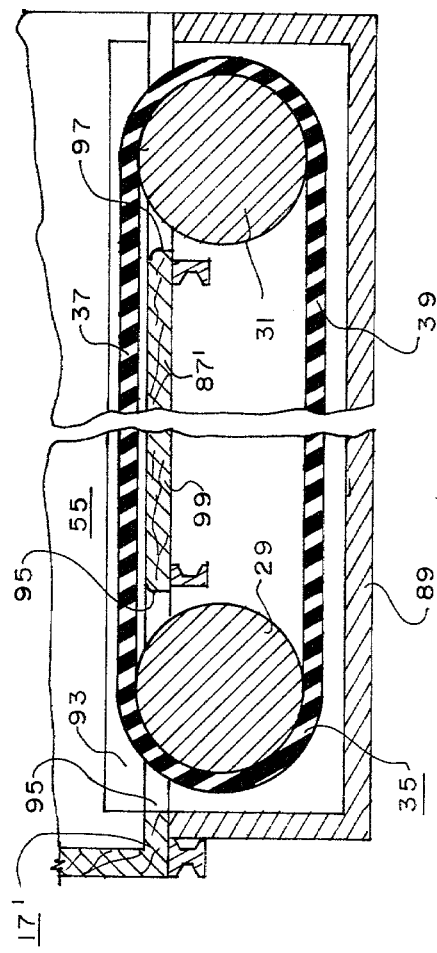

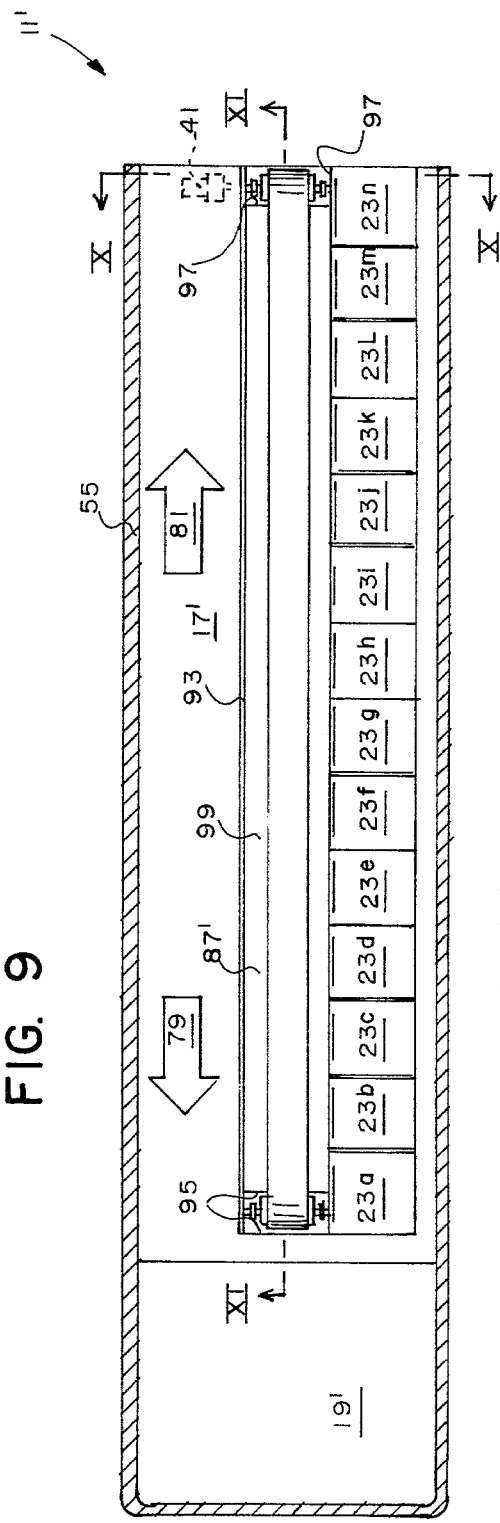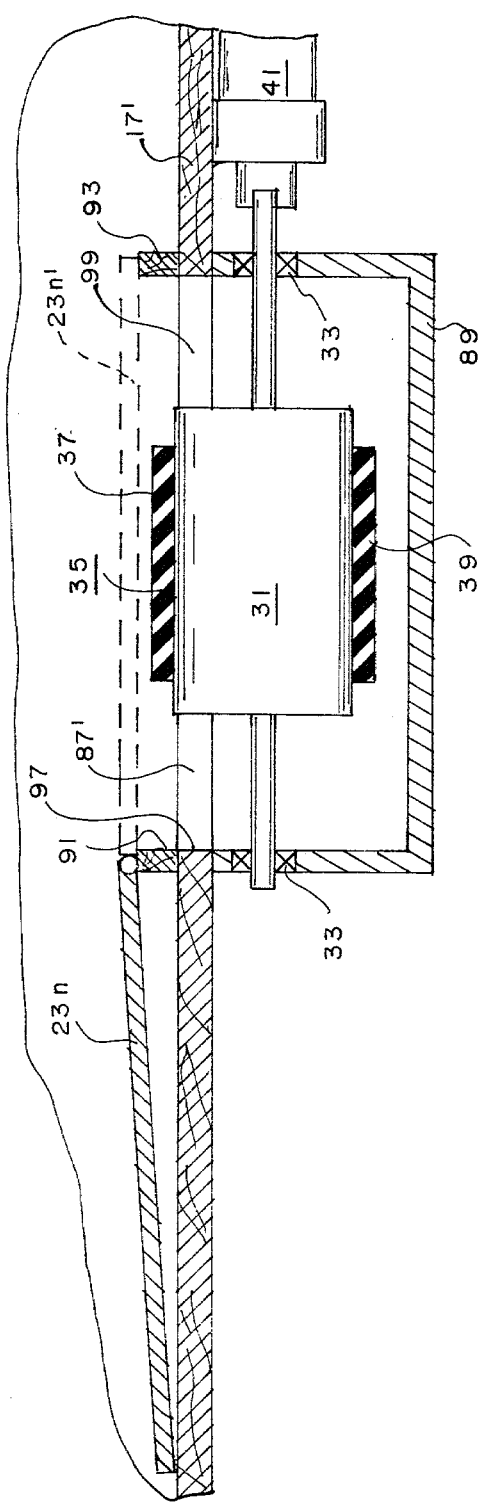

CONVEYOR SYSTEM FOR LOADING AND UNLOADING TRUCKS AND TRAILERS

BACKGROUND OF THE INVENTION

1. Field of the Invention

This invention relates to the field of cargo moving apparatuses for trucks and trailers.

2. Description of the Prior Art

Numerous different configurations of loading and unloading apparatuses for vehicles have heretofore been developed. Indeed, many U.S. patents have been granted for such devices. For example, see Pat. Nos. 2,916,169 granted to DeWitt; 2,507,252 granted to Hoover; 1,945,532 granted to Lima; 2,912,129 granted to Varrone; 3,905,494 granted to Yatagai and Tamura; 3,998,343 granted to Fors; and 4,111,318 granted to Lutz. It is significant to note that none of the above mentioned patents suggests nor discloses applicant's device.

In spite of the numerous developments in this field, there still exists a need for a more widely acceptable conveyor system. It can be appreciated that when undertaking the task of modifying a truck or trailer with elaborate conveyor apparatus, the cost thereof can often times not be justified. This is particularly so when considering the versatility of the well known and industry-wide use of forklifts or front-end loaders, at least from the standpoint of efficiency and economy. However, certain disadvantages or problems prevail in the use of such forklifts. Indeed, since certain of these disadvantages were so well stated in the above mentioned Fors patent '343, the following will be quoted therefrom:

"A steadily increasing volume of cargo is transported by truck trailer and must be loaded into the trailer at origin, unloaded from the trailer at freight terminals, and then sometimes reloaded on a local delivery truck and subsequently unloaded at its final destination point. Where possible, cargo is placed on pallets which are carried by front-end loaders into and out of the truck trailers. While such loading is relatively fast, it possesses a notable risk factor for the operator and others who must operate the loader in narrow, often poorly lighted trailers in close proximity to heavy objects which can easily fall or tip within the trailer. When the cargo is of a type impossible to handle with the front-end loader or one which is not easily shipped on pallets, the cargo must be loaded on the trailer by hand labor. In any event, the cargo is always transferred from the loading dock to the trailer starting with the loading of the front end of the trailer and progressing rearwardly until the trailer has been filled to the doors at the rear cargo entrance, a distance of up to fifty feet. If loading by hand, a laborer must make many trips back and forth along the fifty foot trailer before it is filled to capacity. It has been estimated that six men can work for approximately six hours to completely load a fifty foot, over the road truck trailer, and such loading is very tedious for the cargo handlers and understandably expensive for the trucking companies.

"Even if hand loading and unloading can be avoided and front-end loaders carry the cargo into and out of the trailer, a high element of risk is present when the 5000 pound front-end loader enters the truck van carrying an additional load of several thousand pounds. An operator may not know until it is too late whether the truck flooring will hold the combined weight of the front-end loader and cargo, and any tipping or overturning of the heavily loaded loader in the narrow confines of the often dark and crowded van interior can be extremely perilous. Often the driver of the front-end loader is assisted by a second worker who leaves the front-end loader to inspect the necessary clearances and light the way while directing the driver of the loader. Accidents in which the lead workman is pinned against cargo or the sidewalls or where cargo falls on him are not unusual, and accordingly it is desirable to be able to load such trailers without driving the front-end loader into the trailer.

"When cargo is unloaded from the truck trailer at freight terminals or at the final destination points, the unloading of the trailer presents the same danger and difficulties as those described for loading. With large and heavy loads, many men or heavy equipment may be required to unload the trailer and many man hours consumed while the expensive truck trailer remains idle and unable to continue its delivery missions until a substantial part of the load has been removed.

"It would be desirable to provide a truck trailer which can be easily loaded and unloaded without requiring a front-end loader to drive within the truck or that workmen repeatedly walk the length of the van to pick up and deposit their loads. Additionally, it would be desirable to reduce the number of man hours required to fully load and unload the van."

Since the expensive elaborate conveyor systems seemingly are not feasible, and the perilous nature of the forklift being what it is, one of the practices in the industry in solving this problem has been to provide typical non-driven roller conveyors that must be man handled and placed on the floor of the dock leading into the cargo body of the truck or trailer. Obviously, this requires extra time and man hours to constantly be moving the conveyor apparatus from place to place. In addition, since this type conveyor is not power driven, additional work must be performed by the workmen in moving the cargo along the conveyor. This, of course, consumes additional man hours and hastens fatiguing of the workmen. Therefore, it would be desirable to incorporate as a permanent fixture of the vehicle an inexpensive simply constructed yet efficient power driven conveyor system to assist in loading and unloading these trucks and trailers. The present invention provides such a solution to the above described problems by: (1) eliminating the perilous nature of the front-end loaders, (2) eliminating the unnecessary man hours in moving typical roller conveyor apparatus from place to place, (3) eliminating the work required to move the cargo along this latter type conveyor, and (4) alleviate the expense involved in incorporating a conveyor system as a permanent fixture with a truck body.

SUMMARY OF THE INVENTION

The present invention is directed towards overcoming the problems and disadvantages of previous conveyor systems for trucks and trailers. The improved conveyor system for loading and unloading trucks and trailers as described herein is incorporated as a permanent fixture of the vehicle to which it is attached and is electrically (AC or DC) driven for moving cargo along the floor of the cargo body. Lanyard structure is rigged upon one wall of the cargo body providing means for manually remotely operating an electrical switch which enables the movement of the conveyor to readily be controlled by the workmen from any location along the length of the cargo body. A series of load-bearing flaps are hingedly attached to the floor of the cargo body along a common hinged axis which extends along the length of the conveyor and being situated parallel with the travel thereof. Each of these flaps may be swingably moved between: (1) a load-bearing position wherein each flap overlaps a portion of the conveyor, and (2) a conveyor exposed position wherein each flap overlays a portion of the floor along side the conveyor. The flap arrangement is constructed so as to be capable of supporting cargo when in the load-bearing position, although, movement of the subjacent conveyor structure remains unhindered thereby.

It will be appreciated by those skilled in the art that the concept of the present invention may readily be incorporated into post marketed vehicles with a minimum of modification being required. On the other hand, the concept could better be adapted to the floor of the vehicles at the point of manufacture, although either technique is deemed to be not only ecnomically feasible but is considered equally efficient in the operation thereof.

BRIEF DESCRIPTION OF THE DRAWINGS

FIG. 4 is an enlarged sectional view taken as on the line IV—IV of FIG. 2.

FIG. 9 is a view similar to FIG. 2 showing certain structure peculiar to an alternate embodiment of the present invention.

FIG. 10 is a view similar to FIG. 4 showing certain enlarged structure peculiar to an alternate embodiment of the present invention with the view being taken as on the line X—X of FIG. 9.

FIG. 11 is a view similar to FIG. 3 showing certain enlarged structure peculiar to the alternate embodiment of the present invention with the view being taken as on the line XI—XI of FIG. 9.

DESCRIPTION OF THE PREFERRED EMBODIMENT

Figure 1:
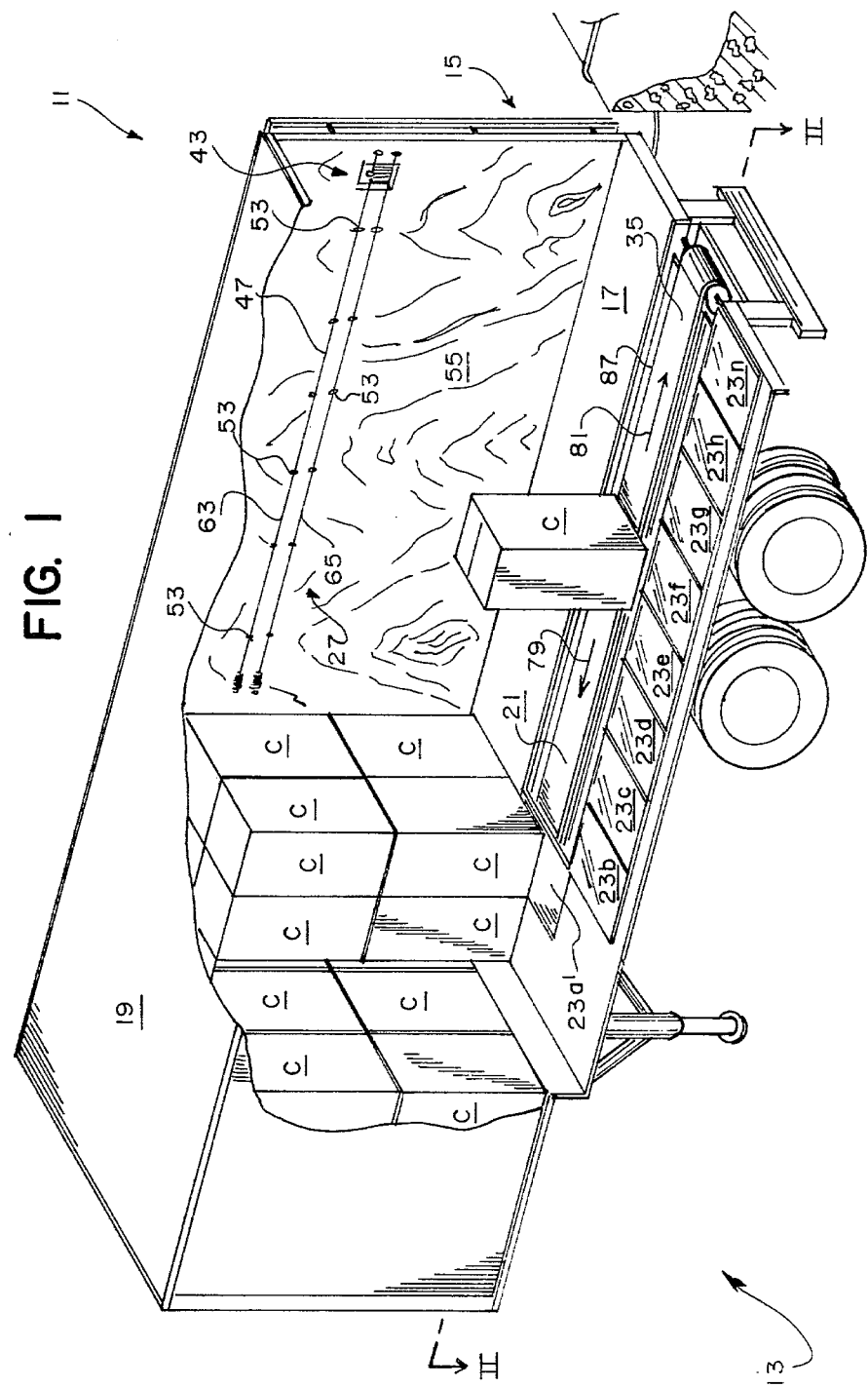
FIG. 1 is a perspective view of a trailer cargo body situated adjacent a typical loading dock with the improved conveyor system for loading and unloading trucks and trailers shown incorporated with the trailer, a portion of the trailer has been broken away to reveal certain features of the invention thus showing several cargo cartons situated within the interior of the trailer.

The improved conveyor system for loading and unloading trucks and trailers 11 of the present invention is intended to be incorporated as a permanent fixture of a truck or trailer (which will be characterized hereinafter by the numeral 13) for assisting in the loading and unloading operation of the truck 13. The improved conveyor system for loading and unloading trucks and trailers which may hereinafter be more simply referred to as conveyor system 11 comprehensively comprises variable traverse means, generally indicated at 15 in FIGS. 1 and 5 of the drawings. The means 15 (as the term variable traverse implies) incorporates unique provisions for varying the traverse capability (or effective length) of the conveyor system 11. Stated another way, the function of the variable traverse means 15 is twofold: (1) it provides means for selectively and progressively abating and augmenting respectively the effective length of the conveyor system 11 commensurate with the loading and unloading operation and (2) it provides means for enabling the entire cargo floor area, as at 17, of the cargo body, as at 19, to be utilized in restingly supporting cargo, characterized hereinafter by the capital letter C. Although, any likelihood of having cargo C directly supported upon the conveyor means 11 during transport of the truck or trailer 13 may be avoided. Thusly, enabling the conveyor system or conveyor means 11 to be effectively operated and/or utilized when the cargo body 19 may be fully loaded as well as when it may be empty, and, of course, the various stages or degrees therebetween. In other words, the variable traverse means 15 enables the effective length of the conveyor means 11 to progressively be abated (or shortened) commensurate with the loading operation and conversely to be augmented (or increased) in length commensurate with the unloading operation of the truck of trailer 13, i.e., in a manner to be more fully understood as the specification proceeds.

The conveyor system 11 includes a power driven belt conveyor apparatus or belt conveyor 21 which is permanently adapted to the floor 17 in a particular manner to be described.

Figure 2:
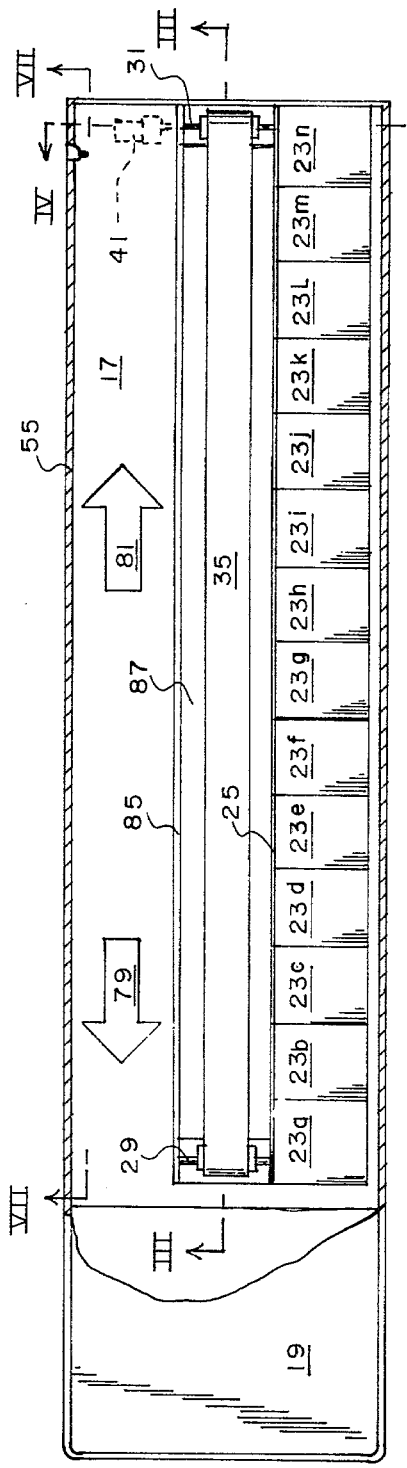
FIG. 2 is a sectional view taken as on the line II—II of FIG. 1 showing the conveyor structure portion of the principal embodiment of the present invention.

The variable traverse means 15 alluded to above includes a series of load-bearing flap means, as at 23, which may individually be designated as 23a, 23b, 23c, etc. The flap means 23, preferably formed from plate steel or the like are hingedly attached to the floor 17 along a common hinge axis, as indicated at 25 in FIGS. 2 and 4 of the drawings. The hinge axis 25 extends substantially parallel with the running length of the conveyor means or belt conveyor 21 and is situated adjacent thereto for individual swingable movement between: (1) a load-bearing position (as shown by the flap means 23a in FIG. 1) where the flap means 23a overlays a portion of the conveyor means or belt conveyor 21 at a spaced distance there above, and (2) a conveyor exposed position (as shown by the individual flap means 23b through 23n in FIG. 2) wherein the several flap means 23b–23n overlay a portion of the floor 17 alongside of the conveyor means or belt conveyor 21. The flap means 23 are capable of supporting cargo C thereon when individually disposed in the load-bearing positions thereof, i.e., the load-bearing position may be further characterized by a prime suffix, thus 23a' in FIG. 1. Although, it will be seen that movement of the subjacent conveyor means or belt conveyor 21 remains unhindered by the load-bearing flap means 23a' etc.

Accordingly, it may now readily be understood that all of the flap means 23 may be moved to their respective load-bearing positions, e.g., as merely shown for the flap means 23a', progressively rearwardly as the cargo body 19 progressively approaches the fully loaded condition. Thus, the effective length of the belt conveyor 21 is abated progressively. In other words, this has the same effect as heretofore when the workmen manually moved the typical roller conveyor apparatus progressively rearwardly as the cargo body 19 was progressively loaded. It is significant to note that since the cargo C may be loaded on the load-bearing disposed flap means 23a', the likelihood of the belt conveyor 21 permanently occupying floor space is obviated.

On the other hand, the flap means 23 may progressively be moved to their conveyor exposed positions commencing with the rearward most flap means, e.g., the flap means 23n, progressively, as the cargo body 19 is being unloaded. Here again, this has the same effect as heretofore when the workmen manually moved the typical roller conveyor apparatus further into the cargo body 19 as the unloading operation progressed. However, it will be appreciated that not only are the man hours required heretofore in moving the typical roller conveyor apparatus from place to place eliminated, but so is the work required heretofore in moving the cargo C along this typical non-power driven conveyor roller apparatus. Equally significant is the elimination of the previously mentioned hazards and problems associated with front-end loaders.

The conveyor system 11 also includes manually operable control means, generally indicated at 27. The control means 27 is disposed within the cargo body 19 for selectively enabling the conveyor means or belt conveyor 21 to be remotely operated and to cease operation. From FIGS. 1 and 5 of the drawings it may readily be seen that the control means 27 is readily accessible to the workmen along the length of the cargo body 19. The preferred arrangement of the control means 27 will be disclosed in detail later in the specification.

The conveyor system 11 (or more specifically the belt conveyor 21) includes a pair of journaled drum pulley means, as at 29, 31. The means 29, 31 are suitably journaled to the frame structure of the cargo body 19 in a manner well known to those skilled in the art or by bearing means, as at 33 in FIG. 4 of the drawings. An endless conveyor belt member 35 is trained about the drum pulley means 29, 31 in a substantially typical fashion or as clearly shown in FIG. 3 of the drawings. Accordingly, the belt 35 establishes horizontally exposed upper and lower flights, as at 37, 39, with the upper flight 37 being adapted for carrying the pieces of cargo C. The physical characteristic of the belt member 35 are deemed to be well known to those skilled in the art. In addition, the drum pulley means 29, 31 preferably are welded steel die crown pulleys of the type well known in the art.

Moreover, the drum pulley means 29, 31 are preferably the type having the following specifications: welded steel die crown of the drum type, with rims, end discs and hubs designed to give maximum strength with reasonable weight, solid end disc construction, with minimum rim overhang, thus preventing an accumulation of material. They should have smooth pulley surfaces so as to provide maximum belt protection. The hubs and end discs should be accurately machined to assure concentricity. All welds should be made by the submerged arc process, using automatic equipment, which assures a uniform weld as strong as the parent metal. They should be of the die crown construction, using a hydro-expansion forming process, which expands the rim metal to a point where the molecules are rearranged in a stronger pattern. This toughening process results in uniform pulleys having a 25% greater yield strength than conventional pulleys. These die-formed pulleys should be perfectly concentric and accurately crowned, assuring longer belt and bearing life. The pulleys should be equipped with taper lock hubs and bushings to facilitate the mounting thereof on the shaft. In this manner, the assembly will have the tightness of a shrink set but can easily be disassembled.

The belt conveyor 21 also includes electric powered gear motor means (AC or DC), as at 41, coupled to at least one of the pair of drum pulley means 29, 31 for causing the endless conveyor belt member to be driven. Such gear motor means 41 are presently readily available under the trade name Dayton. These Dayton gear motors are available in various horsepower from $\frac{1}{3}$ to $\frac{3}{4}$ horsepower. They are capacitor start gear motors built for heavy duty service on applications requiring a low speed, high torque drive such as conveyors. They are of the integral construction, with the motor mounted directly on the gear case, thus providing a more compact unit and permitting better gear alignment which improves the seal life. They are further characterized by having forged bronze worm wheels and hardened steel worm gears. Also, the rotor is diecast aluminum and the gear case has open ball bearings to allow gear case lubricant to enter the bearings. The high speed input shaft has a double lipped oil seal. Two double lipped oil seals on the output shaft provide four sealing surfaces for maximum protection in hostile atmospheres. These gear motors may be mounted in any of four putput shaft positions; horizontal, vertical, or at 90° angles, by interchanging the breather plug location. Shaft rotation is easily reversed by electrically reconnection in accordance with the instructions provided with the Dayton gear motor.

Particular attention is now directed toward FIGS. 5–8 of the drawings wherein it may be seen that the belt conveyor 21 also includes switch means, as at 43, which is suitably coupled to the gear motor means 41 for controlling the conveyor means or belt conveyor 21, in a manner not shown, but which is well known to those skilled in the art. The gear motor means 41 is responsive to the switch means 43 for forward and reverse travel selectively of the conveyor means or belt conveyor 21. Switch means 43 of the type required herein is presently offered by the Square D Company. These Square D switch means 43 are of the type which include lever means, as at 45, which in this invention is situated for access within the cargo body 19 for facilitating the operation of the switch means 43. The stock number for the Square D switch of the type herein described is 6×609, although, for greater horsepower ratings stock number 6×610 should be used. In this regard, the stock number for the previously mentioned Dayton gear motor means 41 is 5K535 for the $\frac{1}{3}$ horsepower motor, 51 K539 for the $\frac{1}{2}$ horsepower and 5K544 for the $\frac{3}{4}$ horsepower motor.

Figure 5:
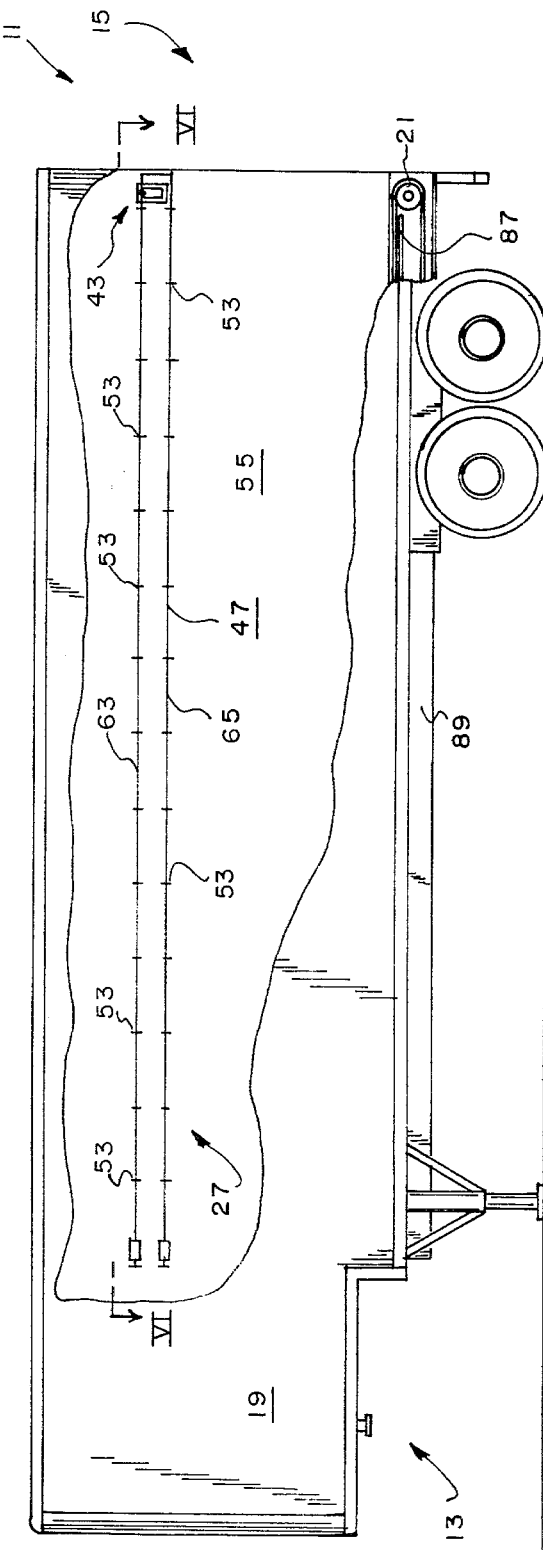
FIG. 5 is a side elevational view of a trailer cargo body similar to FIG. 1 having a portion thereof cut away to reveal pertinent structure of the present invention.
Figure 7:
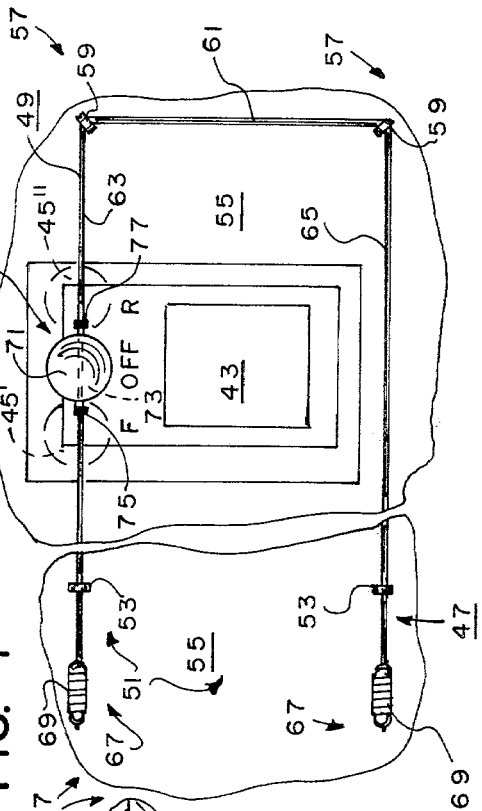
FIG. 7 is a partial enlarged sectional view taken as on the line VII—VII of FIG. 2.
Figure 6:
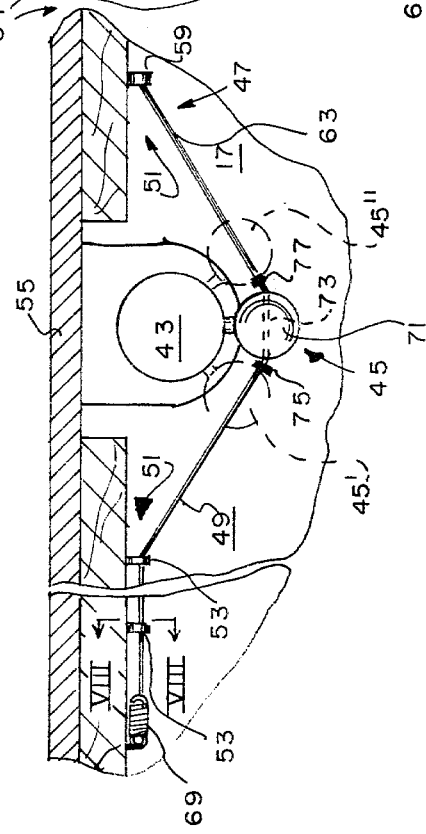
FIG. 6 is a partial enlarged sectional view taken as on the line VI—VI of FIG. 5.

The manual operable control means 27 includes rigged lanyard means, as at 47 and as clearly shown in FIGS. 5 through 7 of the drawings. The means 47 extends along the length of the interior of the cargo body 19 and is attached to the lever means 45 for remotely operating the switch means 43, in a manner about to be disclosed.

The rigged lanyard means 47 includes a cordagelike member 49 having a predetermined length which is sized to be commensurate with the length of the cargo body 19. Also included therewith are cordage support means, generally indicated at 51, which preferably are constituted by a plurality of eyebolt members, as at 53, for supporting the cordagelike member 49 on a wall, as at 55, of the cargo body 19. The cordage support means 51 includes sheavelike means, as at 57, which preferably (but not necessarily) are simply constituted by eyebolt members, as at 59, for establishing a bight from the cordage member, as at 61. The bight 61 clearly configures a pair of parallel spaced apart cordage sections, as at 63, 65, both of which extend substantially the length of the cargo body 19 for reasons yet to be disclosed.

The rigged lanyard means 47 also includes bias means, generally indicated at 67 in FIG. 7, which preferably are constituted by a pair of helical tension spring members 69, 71, for respectively yieldably attaching the cordage sections 63, 65 (or the cordagelike member 49) to the cargo body 19. In this manner, the cordagelike member 49 may manually be yieldably urged to move about the sheavelike means 57, within limits as determinable by the bias means 67. More specifically, the strength of the spring member 69, 71 are such that they will enable an unbalanced condition to exist, i.e., the springs 69, 71 do not return the sections 63, 65 to a neutral position subsequent to releasing either section 63, 65 but rather permit one spring member to be under slight tension until the other section 63, 65 is pulled.

The distal end of the lever means 45 preferably terminates at a knob, as at 71, which is provided with an aperture, as at 73, for receiving the cordagelike member 49. Adjacent either open end of the aperture 73 are disposed a pair of fixable members; as at 75, 77 in FIGS. 6,7; which may be attached to the cordagelike member 49 so as to prevent any slidable movement of the cordage member 49 through the aperture 73, i.e., when either cordage section 63, 65 is manually pulled.

In this manner, the cordagelike member 49 is fixedly attached to the lever means 45 for manually remotely operating the switch means 43 as the cordagelike member 49 is caused to be moved about the sheavelike means 57, i.e., by pulling action on either cordage section 63, 65.

Accordingly, the workmen may remotely operate the switch means 43 by manually pulling on either of the pair of cordage sections, e.g., the cordage section 63, in accomplishing movement of the lever means 45 in one direction (characterized in FIGS. 6, 7 by the numeral 45 having a prime suffix, thus 45') which causes the conveyor means or belt conveyor 21 to travel in a forward direction (characterized by the arrow 79). On the other hand, pulling action on the other cordage section 65 causes movement of the lever means 45 in a direction which is opposite, i.e., characterized by the numeral 45 having a double prime suffix, thus 45". In this manner, the belt conveyor 21 is caused to travel in a reverse direction characterized by the arrow 81.

Particular attention is now directed towards FIGS. 3 and 4 of the drawings wherein it may be seen that the preferred configuration for the belt conveyor 21 is to recess the upper flight 37 of the belt member 35 below the cargo floor 17. It will be appreciated by those skilled in the art that this arrangement perhaps may be more economically feasible at the time the cargo body 19 is manufactured. However, while the post marketed cargo body 19 could be modified, if desired, to include the arrangement depicted in FIGS. 3 and 4, it is deemed more feasible to accomplish a similar modification that will be in accordance with an alternate embodiment to be disclosed later in the specification.

Figure 3:
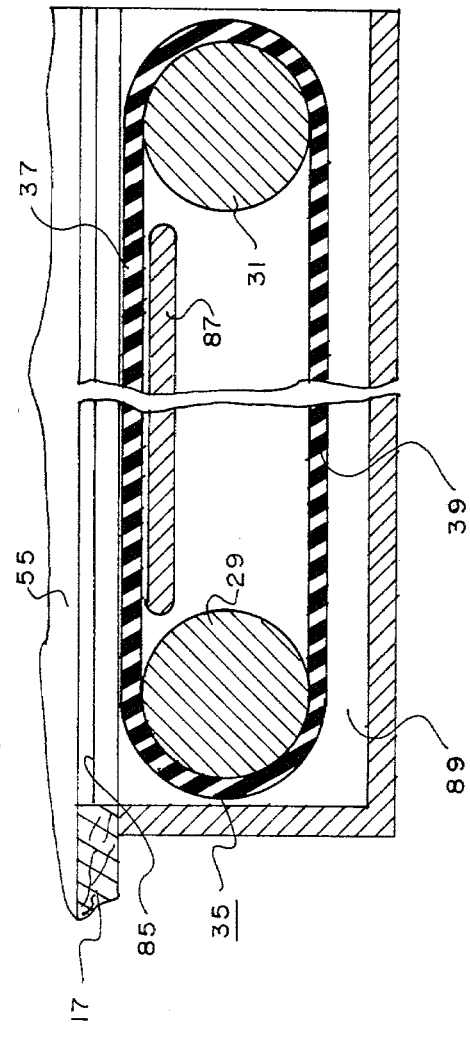
FIG. 3 is an enlarged sectional view taken as on the line III—III of FIG. 2.
Figure 8:
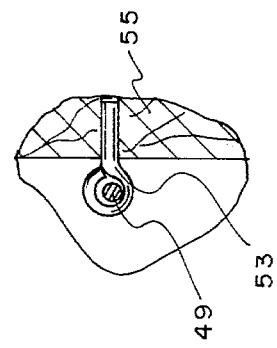
FIG. 8 is a partial enlarged sectional view taken as on the line VIII—VIII of FIG. 6.

It will readily be recognized that a distinct advantage of the structure shown in FIGS. 3 and 4 is that when the flap means 23 are disposed in their load bearing positions, e.g., as at 23n', the flaps 23 are flush with the upper surface of the cargo floor 17. In order to accomplish this, the cargo floor 17 is provided with confrontingly arranged offset portions, as at 83, 85 for receiving the opposite marginal ends of the flap means 23 when in their load bearing positions. In addition, suitable support means, as at 87, is properly adapted to support the upper flight 37 as it moves between the drum pulley means 29, 31. The support means 87 may take on various forms of construction well known to those skilled in the art. Indeed, it may be desirable that the support means 87 include a plurality of rollers suitably adapted in a manner well known to those skilled in the art.

In addition, the conveyor system 11 preferably includes suitable shroud means, as at 89, for housing the belt conveyor 21. Accordingly, the shroud means 89 provides protection for the belt conveyor 21, i.e., against water and road dust that may be present in the immediate area and adjacent the exterior of the shroud means 89. Since the gear motor means 41 is preferably of the type that is totally enclosed (TEFC) for service in ambients of extreme dust, dirt or airborne abrasives, it need not be enclosed within the shroud means 89.

The shroud means 89 includes suitable support structure for supporting the bearing means 33 thus enabluing the drum pulley means 29, 31 to rotate freely. Also, the support means 87 preferably is supported by the shroud means 89, as indicated in FIG. 4.

Particular attention is now directed towards FIGS. 9 through 11 of the drawings where it may be seen that an alternate embodiment of the conveyor system is depicted. The alternate conveyor system will be characterized by the numeral 11 having a prime suffix, thus 11'. It will be understood that structure included in the alternate embodiment which is identical to that of the principal embodiment will be characterized by like numerals. In addition, structure which may differ only slightly from that disclosed in the principal embodiment will be distinguishable by a prime suffix. On the other hand, structure which is peculiar to the alternate embodiment will be so designated or characterized by numerals peculiar thereto.

The alternate embodiment 11' is primarily intended for adaptation to a post marketed cargo body 19'. More specifically, it is deemed that the structure peculiar to the alternate embodiment is more economically feasible in modifying a post marketed cargo body 19'.

Generally speaking, the primary difference between the alternate embodiment 11' and the principal embodiment is that the upper flight 37 is disposed so as to be above the existing cargo floor 17'. This is accomplished by incorporating a pair of rails 91, 93 which are disposed on either side of the belt conveyor 21 and extend substantially the length thereof.

The cargo body 19 is modified to receive the conveyor system 11' by first providing a pair of openings, as at 95, 97, in the cargo floor 17' for respectfully receiving the drum pulley means 31 or as substantially shown in FIG. 11 of the drawings. The rails 91, 93 are suitably sized so as to restingly support the flap members 23 a spaced distance above the upper flight 37, i.e., when in their load bearing positions thereof. The rails 91, 93 are fixedly attached to the floor 17' in any well known manner, e.g., screw fastener means or the like not shown.

From FIG. 11 of the drawings it may also be seen that the support means 87 as previously described for the principal embodiment is, indeed, established by a portion of the floor 17', i.e., a portion indicated as at 99 and being further characterized by the numeral 87'.

Accordingly, it may readily be seen, particularly from FIG. 10 of the drawings, that while the cargo C may readily be restingly supported upon the flap means 23 when in the load bearing position positions thereof, the floor 17', of course, does not remain uninterrupted as it does with the principal embodiment floor 17 or as shown in FIG. 4 of the drawings. In other words, the floor 17' will have a prominent portion extending medially thereof along the fore to aft length of the cargo body 19'. Of course, if desirable, this prominent portion could readily be eliminated by laying in a second floor having a thickness substantially equal to the combined height of the rails 93, 95 and the thickness of the flap means 23, i.e., covering merely that portion of the floor 17' on either side of the belt conveyor 21. Nonetheless, the advantages offered by the concept of the present invention are fully realized in either embodiment.

Although the invention has been described and illustrated with respect to preferred and alternate embodiments thereof, it should be understood that it is not intended to be so limited since changes and modifications may be made therein which are within the full intended scope of the invention.

I claim:

1. The combination with a cargo transport truck of the type having a cargo body of self-contained powered conveyor means for assisting in the loading and unloading operation wherein the improvement comprises: variable traverse means for: (1) selectively and progressively abating and augmenting respectively the effective length of the conveyor means commensurate with the loading and unloading operation, and (2) enabling the entire cargo floor area of the cargo body to be utilized in restingly supporting cargo although any likelihood of having cargo directly supported upon the conveyor means during transport of the truck may be avoided for enabling the conveyor means to be effectively operated when the cargo body may be fully loaded as well as when it may be empty and the various stages therebetween; and manually operable control means for selectively enabling said conveyor means to be operated in forward and reverse directions and to cease operation, said control means including a first control means including a first control member being readily accessible along and extending substantially the entire length of the cargo body and a second control member being readily accessible along and extending substantially the entire length of the cargo body and substantially coextensive with said first control member, a manual action on said first control member causing said conveyor means to travel in a forward direction, a manual action on said second control member causing said conveyor means to travel in a reverse direction.

2. The combination as set forth in claim 1 in which said variable traverse means includes a series of load-bearing flap means each being hingedly attached to the floor of the cargo body along a common hinge axis extending substantially parallel with the running length of the conveyor means and adjacent thereto for individual swingable movement between: (1) a load-bearing position wherein the flap means overlays a portion of the conveyor means at a spaced distance thereabove, and (2) a conveyor exposed position wherein the flap means overlays a portion of the floor along side of the conveyor means; said load-bearing flap means being capable of supporting cargo thereon when in said load-bearing position although movement of the subjacent conveyor means remains unhindered thereby.

3. The combination as set forth in claim 1 in which the conveyor means includes a pair of journeled drum pulley means, an endless conveyor belt member trained about said drum pulley means establishing horizontally disposed upper and lower flights with said upper flight being adapted for carrying the pieces of cargo, electric-powered gear motor means coupled to at least one of said pair of drum pulley means for causing said endless conveyor belt member to be driven, and switch means coupled to said gear motor means for controlling said conveyor means, said gear motor means being responsive to said switch means for forward and reverse travel selectively of said conveyor means.

4. The combination with a cargo transport truck of the type having a cargo body of self-contained powered conveyor means for assisting in the loading and unloading operation wherein the improvement comprises: variable traverse means for: (1) selectively and progressively abating and augmenting respectively the effective length of the conveyor means commensurate with the loading and unloading operation, and (2) enabling the entire cargo floor area of the cargo body to be utilized in restingly supporting cargo although any likelihood of having cargo directly supported upon the conveyor means during transport of the truck may be avoided for enabling the conveyor means to be effectively operated when the cargo body may be fully loaded as well as when it may be empty and the various stages therebetween; the conveyor means including a pair of journeled drum pulley means, an endless conveyor belt member trained about said drum pulley means establishing horizontally disposed upper and lower flights with said upper flight being adapted for carrying the pieces of cargo, electric-powered gear motor means coupled to at least one of said pair of drum pulley means for causing said endless conveyor belt member to be driven, and switch means coupled to said gear motor means for controlling said conveyor means, said gear motor means being responsive to said switch means for forward and reverse travel selectively of said conveyor means; manually operable control means disposed within said cargo body and being coupled to said switch means for selectively enabling said conveyor means to be operated and to cease operation, said manually operable control means being readily accessible along the length of the cargo body; said switch means including lever means situated for access within said cargo body for facilitating the operation of said switch means; said manually operable control means including rigged lanyard means extending along the length of the interior of said cargo body and being attached to said lever means for remotely operating said switch means; said rigged lanyard means including a cordagelike member having a predetermined length which is sized to be commensurate with the length of the cargo body, cordage support means for supporting said cordagelike member on a wall of the cargo body, said cordage support means including sheavelike means for establishing a bight from said cordage member, thus configurating a pair of parallel spaced apart cordage sections both extending substantially the length of the cargo body; and bias means attached to said pair of cordage sections for yieldably attaching said cordagelike member to the cargo body thus said cordagelike member may manually be yieldably urged to move about said sheavelike means, within limits as determinable by said bias means; said cordagelike member being attached to said lever means for remotely operating said switch means as said cordagelike member moves about said sheavelike means whereby manually pulling on one of said pair of cordage sections is effective in accomplishing movement of said lever means in one direction thus causing said conveyor means to travel in a forward direction while pulling action on the other one of said cordage sections causes movement of said lever means in a direction which is opposite to said one direction thus causing said conveyor means to travel in a reverse direction.

* * * * *